July 5, 1966  F. GARAMY  3,259,158
ADJUSTABLE KEYHOLE SAW
Filed July 7, 1964
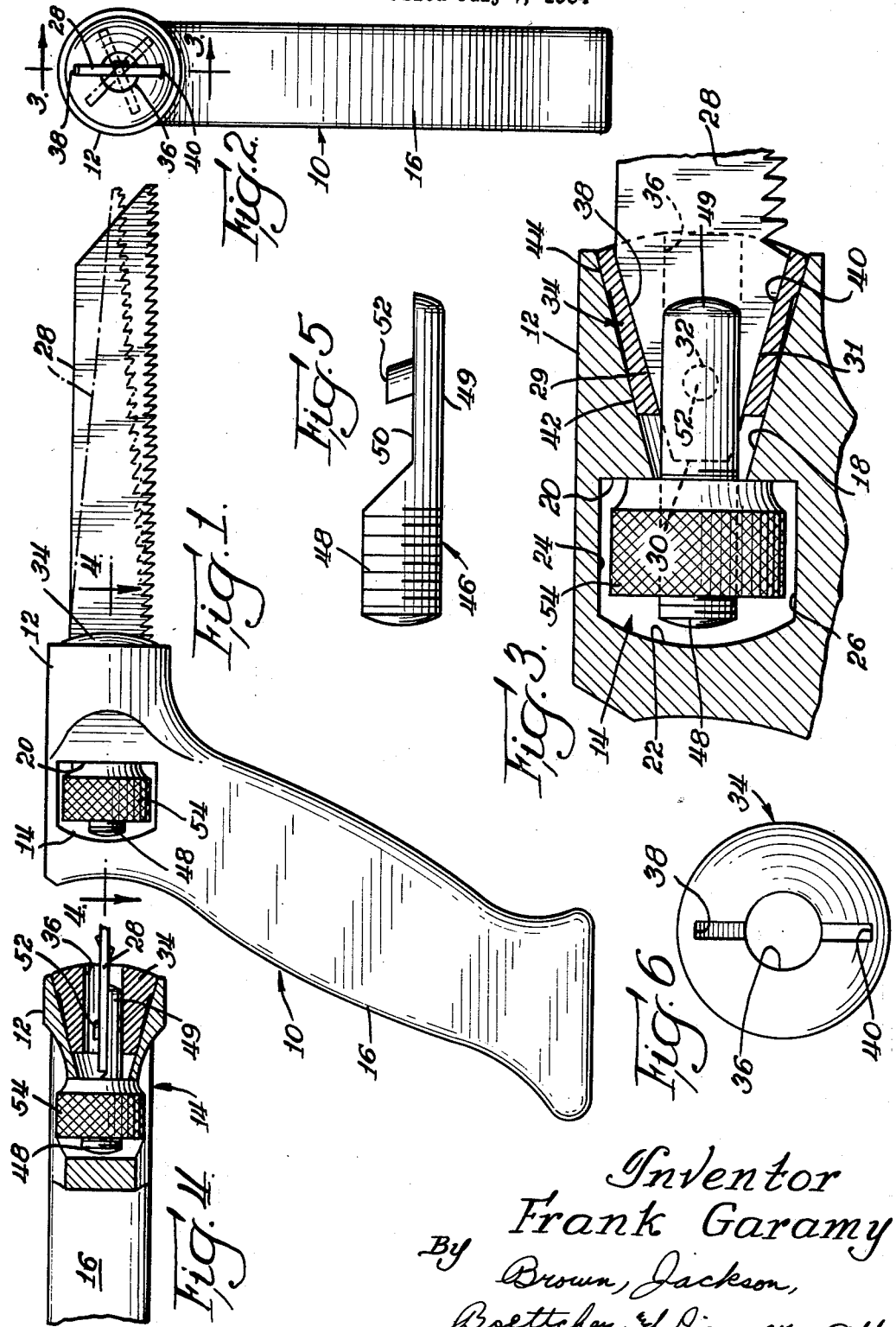
Inventor
Frank Garamy
By Brown, Jackson,
Boettcher & Dienner Attys United States Patent Office 3,259,158
Patented July 5, 1966

3,259,158
ADJUSTABLE KEYHOLE SAW
Frank Garamy, Louisville, Ky., assignor to Vermont American Corporation, Louisville, Ky., a corporation of Kentucky
Filed July 7, 1964, Ser. No. 380,781
6 Claims. (Cl. 145—108)

The present invention relates to a keyhole saw having improved means for mounting the saw blade to rigidly secure the same and also permit rotary adjustment of the blade to any angle through 360 degrees.

It is an object of the present invention to provide an improved saw wherein the blade is held in a rigid and efficient manner for resistance of the forces developed during a sawing operation.

Another object of the invention is to provide an adjustable saw wherein the blade can be rotated and locked in any position through a full 360 degrees.

A further object is to provide a keyhole saw which is relatively inexpensive to manufacture and assemble and which is efficient and durable in use.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of my invention.

In the drawings:

FIGURE 1 is a side elevational view of a saw constructed in accordance with the present invention, one saw blade being shown in solid lines, and an alternative form of blade being shown in dash lines;

FIGURE 2 is a front elevational view of the saw of FIGURE 1, the saw blade being shown in solid lines disposed in a vertical plane, and being shown in dash lines in two alternative rotary positions;

FIGURE 3 is an enlarged fragmentary vertical section taken substantially along the line 3—3 of FIGURE 2;

FIGURE 4 is a fragmentary horizontal sectional view taken substantially along the line 4—4 of FIGURE 1;

FIGURE 5 is an enlarged detail elevational view of a tension screw for anchoring the saw blade of the saw of the present invention; and FIGURE 6 is an enlarged front elevational detail view of a blade nut member having a tapered slot for seating the rear end of the saw blade.

Referring now to the drawings, there is shown a handle member 10 which may comprise an aluminum die casting and which includes a socket 12, an aperture or open area 14 rearwardly of the socket, and a handle 16 for gripping of the saw. The socket 12 has a frusto-conical bore 18 which tapers radially inwardly toward the rear of the socket and communicates with the open area 14 rearwardly of the socket, the open area being defined by a flat front wall 20, an arcuate rear wall 22, and flat upper and lower walls 24 and 26.

A saw blade 28 is provided and as shown in FIGURE 3 the rear end of the blade is tapered, the opposite edges 29 and 31 being tapered inwardly toward one another as they extend rearwardly. The extreme rear end of the saw blade 28 is indicated at 30, and forwardly thereof the blade is provided with a transverse hole 32 to facilitate anchoring of the blade within the socket 12. The tapered end of the saw blade 28 is seated in a blade nut 34 which is generally frusto-conical in its outer configuration and has an axial bore 36. The blade nut 34 may be manufactured from powdered sintered iron. In addition, as best shown in FIGURES 3 and 6, the blade nut 34 is provided with a pair of internal oppositely disposed tapered slots defined by walls 38 and 40 which are tapered so as to correspond substantially with the taper of the edges 29 and 31 at the rear end of the saw blade 28. The slots communicate with the axial bore 36 and are of a thickness sufficient to accommodate the saw blade 28. Accordingly, the tapered rear end of the saw blade 28 is seated or wedged in the blade nut 34 with the edge 29 of the saw blade disposed in one of the tapered slots in the nut 34 and engaged against the tapered wall 38, and with the edge 31 of the saw blade disposed in the opposite one of the tapered slots in the nut 34 and engaged against the tapered wall 40. The blade nut 34 is provided with a pair of axially spaced external annular bearing surfaces 42 and 44, and being frusto-conical in its outer configuration, the blade nut is seated within the frusto-conical bore 18 in the socket 12 with the bearing surfaces 42 and 44 engaged against the wall of the bore.

A steel tension screw 46, best shown in FIGURE 5, has a cylindrical threaded end 48, and a relatively thin opposite end 49 which is cut away to provide a generally flat surface 50 which has a fixed pin or stud 52 projecting therefrom. The pin 52 is disposed at an angle of about 75 degrees to the axis of the tension screw and it is thus inclined slightly toward the threaded end 48. Referring to FIGURES 3 and 4, the tension screw 46 is anchored to the rear end of the saw blade 28 by positioning the same with the flat portion 50 disposed against the side of the saw blade and with the pin 52 projecting through the hole 32 formed in the saw blade. The screw 46 is disposed so that it extends through the bore 36 in the blade nut 34 with the threaded end 48 projecting through the bore 18 in the socket 12 and into the open area 14 at the rear of the socket. A nut 54 is disposed in the open area 14 and is threaded on the end 48 of the tension screw 46. The nut 54 bears against the wall 20 at the forward end of the open area 14 for support, whereby when the nut is threaded on the screw end 48 the screw is pulled rearwardly. The tension screw 46 thus pulls the blade 28 rearwardly to cause the blade to seat in the blade nut 34, and in addition to cause the blade nut to seat in the frusto-conical bore 18 in the socket 12.

It will be understood from the foregoing that when the nut 54 is tightened, the saw blade 28 will be rigidly held in a given position. However, upon loosening the nut 54, the blade 28 together with the blade nut 34 and tension screw 46 can be rotated in the socket 12 to adjust the rotary position of the blade, and once the blade is disposed in any desired position through 360 degrees, the nut 54 is tightened to secure the blade in such position.

The blade 28 itself is not drawn against the socket 12, and the blade nut 34 which seats in the socket is provided with a relatively large bearing area for engagement with the frusto-conical bore 18. Accordingly, it is practical to manufacture the handle member 10 as an aluminum die casting. It is also important to note that the blade is not held as in a collet by applying clamping forces at right angles thereto. Instead, the blade is held by being pulled axially rearwardly by the tension screw 46 into a seated position in the blade nut 34, and the latter in turn is seated in the frusto-conical bore 18 in the socket 12.

While I have illustrated my invention in a preferred form, I do not intend to be limited to that form, except insofar as the appended claims are so limited, since modifications coming within the scope of my invention will be readily suggested to others with my disclosure before them.

I claim:

1. A saw comprising, in combination, a handle having a gripping portion and a socket portion, an opening formed in the front of said socket portion and communicating with the rear thereof, a blade mounting member disposed in said opening and seated therein, a saw blade, an opening in said mounting member having opposed tapered end walls for seating the rear end of said saw blade, tension means extending through the rear of said mounting member and anchored to the rear end of said blade for pulling the blade rearwardly to seat the rear end of said blade against said tapered end walls in said mounting member and also seat said mounting member in said opening in said socket, said tension means including a threaded rear end which extends rearwardly of said socket, and nut means threaded on the rear end of said tension means for pulling said tension means rearwardly to secure said saw blade in a predetermined adjustable rotary position.

2. A saw comprising, in combination, a handle having a gripping portion and a socket portion, a generally frusto-conical opening formed in the front of said socket and communicating with the rear thereof, a generally frusto-conical blade mounting member disposed in said opening and seated therein, a saw blade, an opening in said mounting member having opposed tapered end walls receiving the rear end of said saw blade, tension means extending through the rear of said mounting member and anchored to the rear end of said blade for pulling the same rearwardly to seat said rear end of the blade against said tapered end walls of said mounting member and also seat said mounting member in said frusto-conical opening in said socket, said tension means including a releasable member braced against said handle for effecting said pulling of said tension means rearwardly to secure said saw blade in a predetermined adjustable rotary position.

3. A saw comprising, in combination, a handle having a gripping portion and a socket portion, a generally frusto-conical opening formed in the front of said socket and communicating with the rear thereof, a generally frusto-conical blade mounting member disposed in said opening and seated therein, a saw blade having a tapered rear end, a slot in said mounting member having tapered end walls for engagement by said rear end of said blade, tension means extending through a provided opening in the rear of said blade mounting member and anchored to said rear end of said blade by which the blade may be pulled rearwardly to seat said blade in said mounting member with its rear end in firm engagement with said tapered side walls and also seat said mounting member in said frusto-conical opening in said socket, said tension means including a threaded rear end which extends rearwardly of said socket, and nut means threaded on the rear end of said tension means and braced against said handle for pulling said tension means rearwardly to secure said saw blade in a predetermined adjustable rotary position.

4. A saw comprising, in combination, a handle having a gripping portion and a socket portion, a generally frusto-conical opening formed in the front of said socket and communicating with the rear thereof, a generally frusto-conical blade nut member disposed in said opening and seated therein, a saw blade having a tapered rear end, an axial bore through said blade nut member, a pair of oppositely disposed tapered slots formed in said blade nut member in communication with said axial bore, said slots being of a thickness sufficient to accommodate said blade and being tapered so as to conform substantially to the tapered rear end of said blade for seating the latter, tension means disposed in said axial bore and anchored to said rear end of said blade for pulling the same rearwardly to seat said blade in said blade nut member and also seat said blade nut member in said frusto-conical opening in said socket, said tension means including a threaded rear end which extends rearwardly of said socket, and nut means threaded on the rear end of said tension means and braced against said handle for pulling said tension means rearwardly to secure said saw blade in a predetermined adjustable rotary position.

5. A saw comprising, in combination, a handle having a gripping portion and a socket portion, a generally frusto-conical opening formed in the front of said socket and communicating with the rear thereof, a generally frusto-conical blade nut member disposed in said opening and seated therein, a saw blade having a tapered rear end with a transverse opening therein, an axial bore through said blade nut member, a pair of oppositely disposed tapered slots formed in said blade nut member in communication with said axial bore, said slots being of a thickness sufficient to accommodate said blade and being tapered so as to conform substantially to the tapered rear end of said blade for seating the latter, tension means disposed in said axial bore and carrying a fixed pin which projects through said transverse opening in said blade to anchor said tension means to said rear end of said blade and thereby permit said tension means to pull said blade rearwardly to seat said blade in said blade nut member and also seat said blade nut member in said frusto-conical opening in said socket, said tension means including a threaded rear end which extends rearwardly of said socket, and nut means threaded on the rear end of said tension means and braced against said handle for pulling said tension means rearwardly to secure said saw blade in a predetermined adjustable rotary position.

6. A saw comprising, in combination, a handle having a gripping portion and a socket portion, a generally frusto-conical opening formed in the front of said socket and communicating with the rear thereof, a generally frusto-conical blade nut member disposed in said opening and seated therein, a saw blade having a tapered rear end with a transverse opening therein, an axial bore through said blade nut member, a pair of oppositely disposed tapered slots formed in said blade nut member in communication with said axial bore, said slots being of a thickness sufficient to accommodate said blade and being tapered so as to conform substantially to the tapered rear end of said blade for seating the latter, a tension screw having a rearwardly disposed generally cylindrical threaded end and having a relatively thin forwardly disposed end with a flat surface formed thereon and with a fixed pin projecting from said flat surface, said tension screw being disposed in said axial bore with said flat surface positioned against one side of said blade and with said pin projecting through said transverse opening in said blade to anchor said tension screw to the rear end of said blade and thereby permit said tension screw to pull said blade rearwardly to seat said blade in said blade nut member and also seat said blade nut member in said frusto-conical opening in said socket, and nut means threaded on the rear end of said tension screw and braced against said handle for pulling said tension screw rearwardly to secure said saw blade in a predetermined adjustable rotary position.

References Cited by the Examiner

UNITED STATES PATENTS 3,114,402    12/1963    Jacoff _____ 145—108

FOREIGN PATENTS 319,671    3/1920    Germany.

BERNARD A. GELAK, *Primary Examiner.*

R. V. PARKER, JR., *Assistant Examiner.*